Aug. 6, 1963 R. LEDUC 3,099,940
STABLE HYDRAULIC SERVO DEVICE
Filed July 26, 1960 4 Sheets-Sheet 1
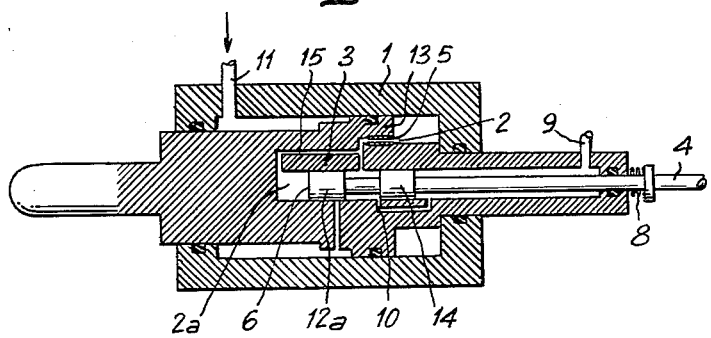
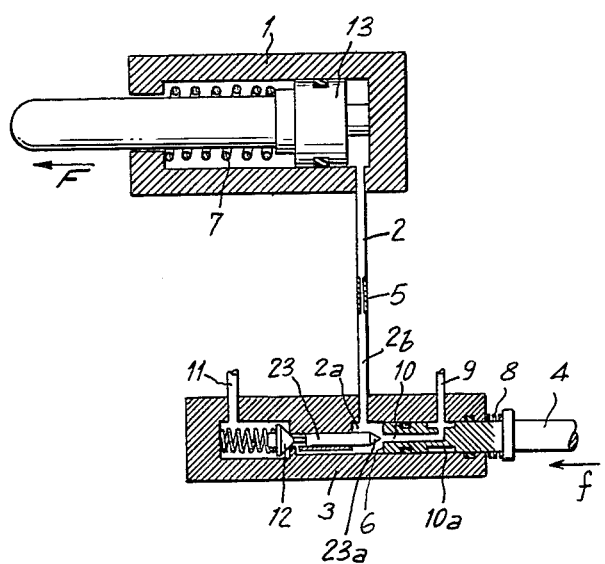

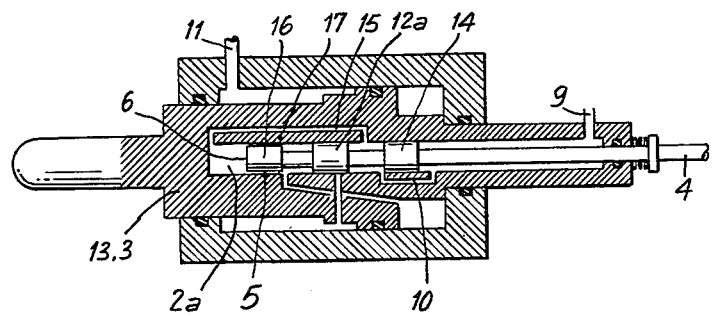
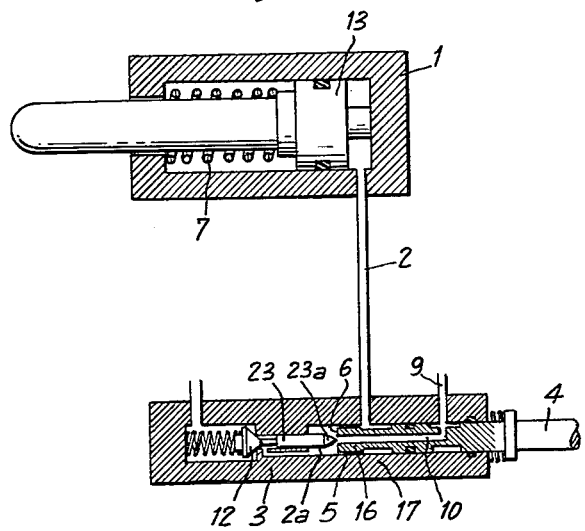

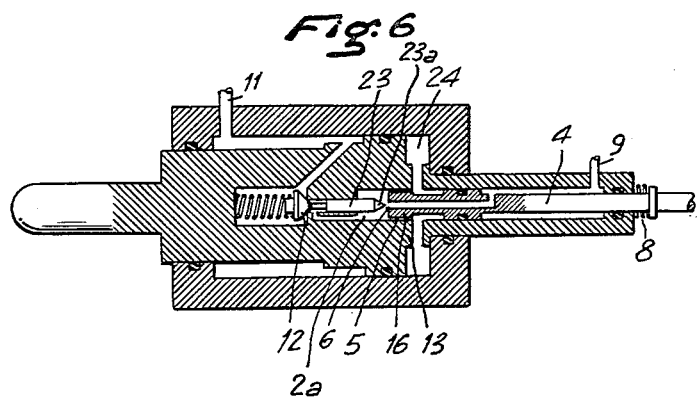
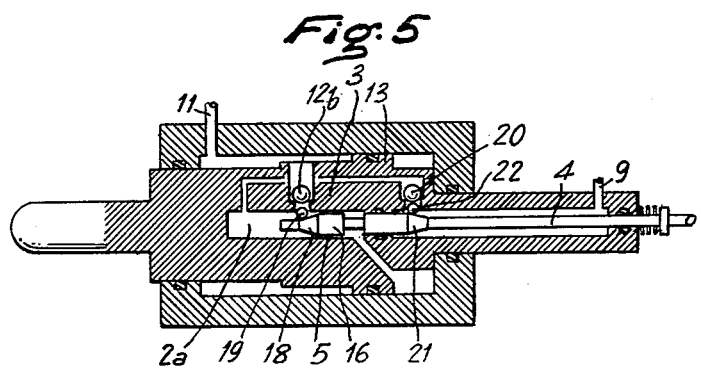
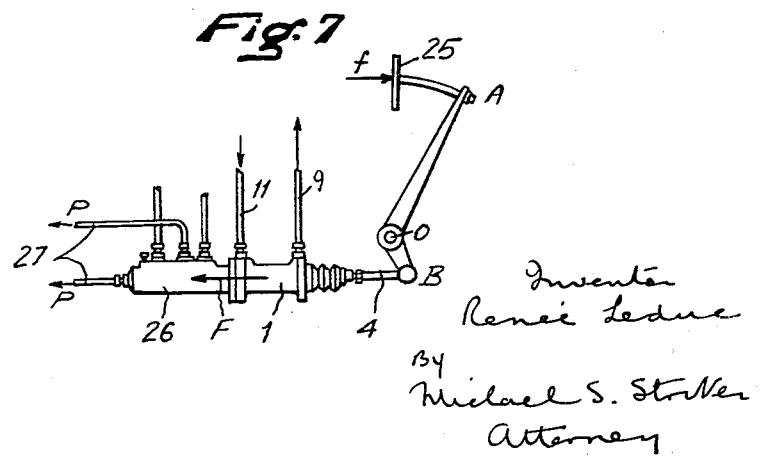

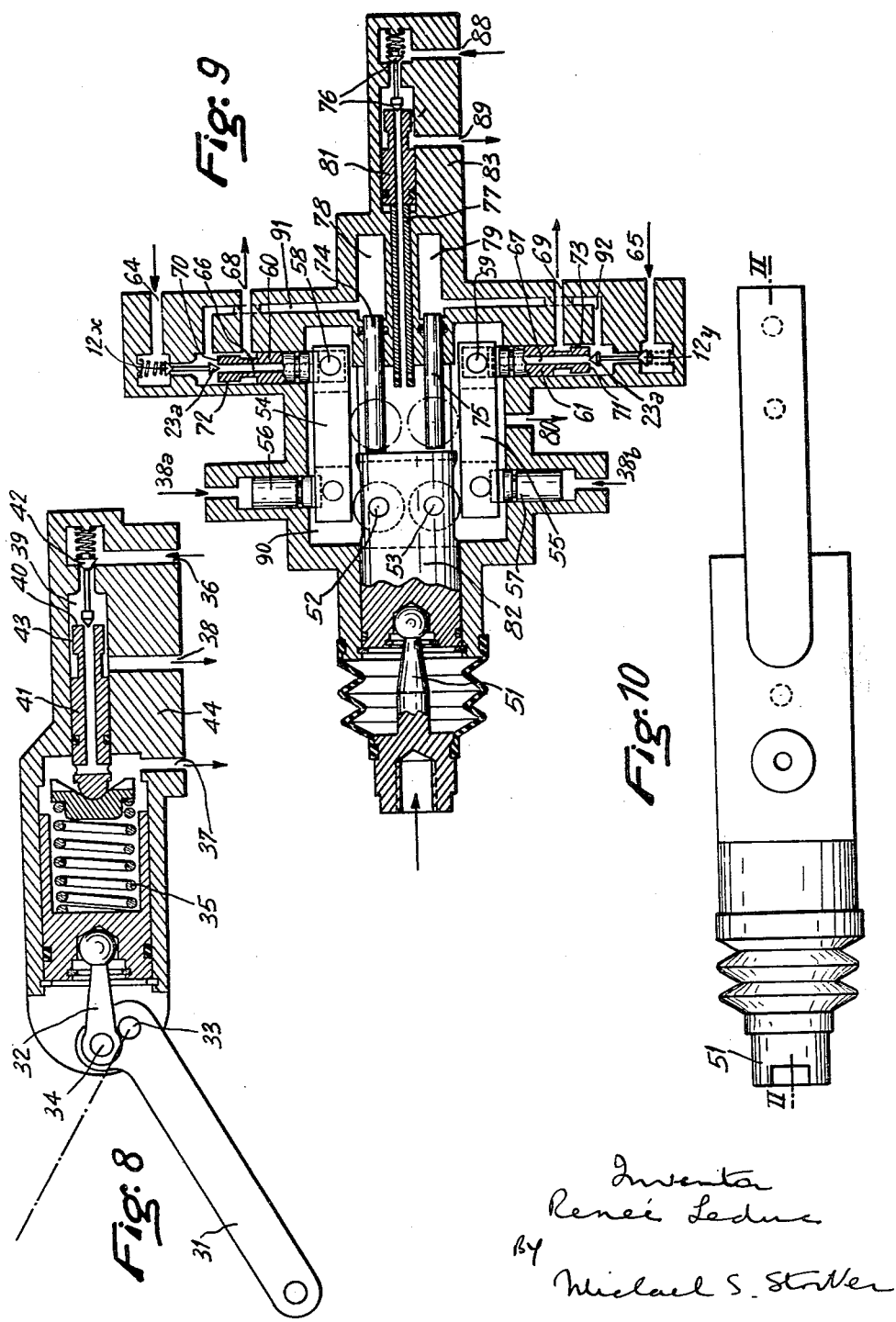

United States Patent Office 3,099,940
Patented Aug. 6, 1963

3,099,940
STABLE HYDRAULIC SERVO DEVICE
René Leduc, 23 Rue Henri Cloppet, Le Vesinet, France
Filed July 26, 1960, Ser. No. 45,369
Claims priority, application France July 27, 1959
14 Claims. (Cl. 91—49)

This invention relates, primarily, to a hydraulic servo-device for transforming an applied effort into a proportional pressure in a manner providing conditions of damping and stability, essential for many applications of such devices, and secondarily, to complete hydraulic systems incorporating such a device.

An object of the invention is a device for controlling the feeding and exhausting of a hydraulic power-utilising mechanism or system, hereinafter referred to for brevity as an "actuator," in such a way that the pressure developed in the actuator, when fed with liquid from a pressure source, increases progressively up to an ultimate value proportional to the effort applied to the controlling member of the device, and that, until the ultimate pressure is reached, the "error" or difference between the instantaneous and ultimate pressures in the actuator is a direct (and preferably substantially linear) function of the mass-flow of liquid into the actuator, whereby the action of the actuator is damped and rendered stable.

A further object of the invention is a valve assembly comprising a valve adapted to close a passage connecting a pressure feed inlet to a service opening connected or connectible to the actuator, a movable control member actuating said valve and having, or being mechanically connected to, a part presenting a surface subjected to the pressure subsisting immediately downstream of the valve, such pressure acting in opposition to the effort applied to the control member to open the valve, a flow-restrictor producing a loss of head, located downstream of the valve and upstream of the service opening, and an exhaust outlet whose communication with the actuator is controlled by valve means forming part of or actuated by the control member.

The restrictor is preferably calibrated and of such a character that the flow through it is laminar, so that it produces a loss of head linearly proportional to the mass-flow through it.

Yet further objects of the invention are: a complete hydraulic system including one or more valve assemblies as above described and one or more actuators; a hydraulic system including a plurality of valve assemblies as described, arranged for the service of two or more actuators, as hereinafter more fully explained; and hydraulic servo-brake systems for vehicles incorporating valve assemblies as described.

How these objects and such others as will hereinafter appear are achieved will be more fully understood from the following description, having reference to the accompanying drawings, of certain embodiments of the invention, given by way of example only and without implied limitation of the scope of the invention which is defined in the hereto appended claims.

In the drawings:

FIGURE 1 is a schematic sectional view of one form of valve assembly according to the invention conjoined with a simple, single-acting actuator;

FIGURE 2 is a similar view of another embodiment, in which the valve assembly, of somewhat different form from that of FIGURE 1, is incorporated in the piston of a differential, double-acting actuator;

FIGURE 3 is a view similar to FIGURE 1 illustrating a detailed modification;

FIGURE 4 is a view similar to FIGURE 2 illustrating a detail modification similar to that of FIGURE 3;

FIGURES 5 and 6 are views similar to FIGURE 4 illustrating modifications; in FIGURE 6 the valve assembly is similar to that of FIGURE 3, in FIGURE 5 the valve assembly, while otherwise similar to that of FIGURE 3, has ball valves in place of poppet and needle valves;

FIGURE 7 is a schematic elevation illustrating the application of an embodiment of the invention to a hydraulic servo-brake system for vehicles;

FIGURE 8 is a schematic section of another embodiment of the invention for delivering hydraulic liquid at a pressure proportional to the displacement of a mechanical element;

FIGURE 9 is a section, on the line II—II of FIGURE 10, of another embodiment of the invention, incorporating a pressure-distributing system adapted to be combined with embodiments as illustrated in FIGURE 8; and FIGURE 10 is an external view of the embodiment illustrated in FIGURE 9.

In FIGURES 1 through 6 of these drawings, corresponding elements are identified by the same reference characters.

FIGURE 1 shows a single-acting hydraulic actuator 1 having a piston 13 (connectible to an external mechanism to be operated) and a return spring 7. Its working chamber is connected by a pipe 2 to a valve assembly housed in a body 3, which is axially bored. In the right hand end of this bore slides a control member 4, urged to the right by a light spring 8. The left hand end of the bore (which is blind) forms a chamber, communicating with a feed inlet 11 for liquid under pressure and containing a valve poppet 12, seatable on a constriction of the bore and loaded, in the seating direction, by a spring. The middle part of the bore constitutes a chamber 2a communicating, via a service opening 2b, with pipe 2 and also with the downstream side of the seating of the poppet 12. The control member 4 has an axial bore 10 opening on the left hand face 6 of the member 4 and communicating, via an annular waisting 10a of the member 4, with an exhaust outlet 9. The valve poppet 12 has a stem 23 terminating in a needle 23a seatable on the open end of bore 10. In the run of the connection between the chamber 2a and the actuator is a calibrated restrictor 5, which for convenience is shown as being in the pipe 2, but in practice will usually be incorporated in the body 3. Restrictor 5, as illustrated, has a single passage, whose length relatively to the cross-sectional area of the passage is great enough to ensure laminar flow through the restrictor.

In the position shown in FIGURE 1, the poppet 12 is seated and the left hand end of the control member 4 is clear of the needle 23a, so that the chamber 2a is shut off from the feed inlet 11 and communicates with the exhaust outlet 9.

When an effort $f$ is applied to the control member 4 to move it to the left, the control member meets the needle 23a causing it to seat in the open end of bore 10 and close the exhaust connection and to move the valve stem 23 and poppet 12 to unseat the latter; since the effort $f$ encounters no resistance (apart from those of spring 8 and the return spring of poppet 12 which are very small and may be neglected) the poppet valve 12 is opened wide, putting the chamber 2a into communication with the feed inlet 11 and establishing in chamber 2a, almost instantaneously, a pressure acting on face 6 of the control member 4 which balances the effort $f$. The liquid now flows from chamber 2a through the restrictor 5 into the working chamber of the actuator 1. The pressure in this chamber is balanced by the resistance encountered by the jack piston 13, composed of the effort exerted by spring 7 and the force to be overcome by the driven mechanism. Initially this resistance is small and the pressure in the actuator chamber is low while the pressure in chamber 2a is high.

Consequently, the initial mass flow through the restrictor 5, which is substantially linearly dependent on the pressure difference across the restrictor, is high.

As liquid flows into the actuator chamber, the pressure in the latter builds up, and the pressure-difference across the restrictor, and hence the mass-flow through it, decrease progressively until they become zero, at which instant the pressure in the actuator has reached its final value and the force F exerted by the piston 13 on the driven mechanism has attained its maximum. At any instant, therefore, the mass flow is proportional to the "error" between the instantaneous and final pressures in the actuator. As this error decreases, the control member 4 progressively recoils to the right causing progressive closure of the valve 12. As a result of this action, the service pressure applied to the actuator 1 tends to attain its final value in a damped and stable manner, the damping factor (for any given actuator) depending only on the dimensional characteristics of the elements of the valve assembly, especially of the restrictor, which can be calibrated according to requirements.

As soon as the valve poppet 12 becomes seated, the situation in the actuator and chamber 2a is stabilised and the recoil of the control member 4 ceases, the needle 23a remaining seated on the open end of bore 10, so that the exhaust opening 9 remains shut-off.

The final value of pressure in the actuator and hence of the force F, thus depends on the effort f applied to the control member 4.

When the applied effort f is discontinued, the spring 8 moves the control member 4 to the right, unseating the needle 23a and enabling the actuator to exhaust via pipe 2, restrictor 5, chamber 2a, bore 10, annular waisting 10a and exhaust outlet 9.

The embodiment of FIGURE 3 differs from that of FIGURE 1 only in that the restrictor 5 is constituted by an annular clearance between an extension of the control member 4 in the form of a piston 16 and the cylindrical bore 17 of the valve assembly 3.

A restrictor of this form is usually preferable to the single, tubular-passage form of FIGURE 1, because, to achieve laminar flow, the required ratio of length to cross-sectional area of the passage is considerably less in the case of an annular passage than in that of a tubular passage. A further advantage of the form of FIGURE 3 is that a relatively long tubular passage of small cross-sectional area is very liable to obstruction by foreign matter (however well filtered the liquid may be), whereas an annular passage between elements having relative axial movement is not liable to obstruction in the same way, since the relative movement tends to dislodge obstructive matter.

In the embodiment of FIGURE 2, the housing 3 of the controlling valve assembly is unitary with the piston 13 of the actuator, which in this instance is of the differential, double-acting type, with continuous pressure feed (at 11) to the chamber having the piston face of smaller area. The valve members are of the piston type rather than the seatable poppet and needle types. The restrictor 5 is a single, tubular, passage as in FIGURE 1. The control member 4 has two pistons 12a and 14, of which piston 12a controls the admission of pressure liquid from the left hand chamber of the actuator, fed from inlet 11, to the right hand chamber of the actuator, via the restrictor 5, the pressure upstream of the restrictor being fed back, via a gallery 15, to the chamber 2a and therein applied to the left hand face 6 of piston 12a, while piston 14 controls the exhausting of the right hand actuator chamber, via a gallery 10 formed in the body of the combined actuator piston and valve housing 13, 3, to the outlet 9.

This embodiment functions in the same way as that of FIGURE 1.

The embodiment of FIGURE 4 is generally similar to that of FIGURE 2, but the restrictor 5 is similar to that of FIGURE 3 being constituted by an annular clearance between an additional piston-element 16 carried by the control member 4 and the cylindrical bore 17 of the actuator piston and valve housing 13, 3. This embodiment operates in the same way as that of FIGURE 2.

The embodiment illustrated in FIGURE 6 is similar to that of FIGURE 4, except that the piston valves are replaced by poppet and needle valves 12, 23, 23a, as in FIGURE 1.

FIGURE 5 illustrates a further modification of the embodiment of FIGURE 6, in which the poppet and needle valves 12, 23, 23a are replaced by balls 12b, 20 respectively, actuated via "pusher" balls 19, 22, by cams 18, 21 formed on the control member 4. In this modification the pressure in chamber 2a is applied to the left hand end of the piston portion 16 of member 4 (including the surface of cam 18) corresponding to face 6 of FIGURE 6.

FIGURE 7 illustrates the application of an arrangement as shown in any of FIGURES 2, 4, 5 or 6 to a hydraulic servo-brake system for vehicles. The actuator is shown at 1, the control member 4 is actuated, through a lever A—B fulcrumed at 0, by a pedal 25 to which the operating effort f is applied; and the force F exerted by the actuator piston is applied to a master hydraulic cylinder 26 delivering pressures P for actuating the brakes by ducts 27.

FIGURE 8 illustrates an adaptation of a valve assembly as shown in FIGURE 3 for producing a hydraulic pressure proportional to the displacement of a mechanical member. In the figure the valve assembly comprises a body 44 having a feed inlet 36, an exhaust outlet 37 and a service connection 38; the control member 44 has an axial bore communicating with the exhaust outlet and providing a seating for the needle of the valve member which also has a spring-loaded poppet seatable on the orifice which provides communication between the feed inlet 36 and the chamber 39 corresponding to chamber 2a of FIGURE 3. Chamber 39 communicates with the service connection 38 via the restrictor constituted by an annular clearance 43 between the terminal part of the control member 41 and the wall of the bore of the body 44 in which member 44 slides. Face 40 of member 41, corresponding to face 6 of FIGURE 3, is subjected to the pressure in chamber 39.

The control member 41 is movable to the right, to open the valve 42, by a lever 31 fulcrumed on a fixed pivot 33 and operating, through a ball-ended link 32 pivotally connected to lever 31 at 34, a thimble 32a engaged by the ball-end of link 32 and slidably mounted in an extension of body 44, a spring 35 and an abutment pad 35a.

Clockwise displacement of lever 31 compresses spring 35, which applies a controlling effort to the member 41 proportional to the angular displacement of lever 31; and as previously explained, the final value of the service pressure delivered at 38 will be proportional to the effort exerted by spring 35.

This adaptation is more especially designed to adjust the hydraulic pressure delivered (at 38) to a hydraulic servo-vehicle-brake proportionally to the load carried by the axle on which is mounted the wheel to be braked. In such an application, the movable end of the lever 31 is connected to the unsprung portion of the wheel suspension and the angular displacement of the lever is proportional to the deflection of the suspension under load, i.e. to the part of the sprung load supported by the axle in question.

Thus, in a vehicle, a device as illustrated in FIGURE 8 may be associated with the front axle (or axles) and a similar device with the rear axle (or axles); and the hydraulic pressures applied to the front and rear brakes respectively, by the service connections 38 of the two devices will be proportional to the loads carried by the respective axles, and the braking efforts applied to the front and rear wheels will be proportioned accordingly.

A pair of devices as illustrated in FIGURE 8 may be combined with an arrangement as illustrated in FIGURES 9 and 10, by which the braking efforts applied to the front and rear brakes of the vehicle are both proportional to the effort exerted by the driver on the brake pedal and respectively proportional to the loads carried by the front and rear axles.

This arrangement comprises a body 83 in which is slidable a member 82, movable to the right by a ball-ended push member 51 actuated by the brake pedal of the vehicle. Member 82 carries rollers 52, 53 providing fulcrums for levers 54, 55, whose left hand ends are connected to pistons 56, 57, respectively subjected to the hydraulic pressures supplied by the service connections 38 of two devices as illustrated in FIGURE 8, as indicated by arrows 38a, 38b. The other ends 58, 59, of levers 54, 55 are respectively connected to the control members 60, 61 of two valve assemblies as illustrated in FIGURE 3, having feed inlets 64, 65; service connections 68, 69 (to the two sets of brakes), annular restrictors 72, 73, the control members 60, 61, having faces 70, 71 subjected to the pressures immediately downstream of the poppet valves 12x, 12y of the valve assemblies. The control members 60, 61, are axially bored at 66, 67, to provide exhaust passages when the needles 23a of the poppet valves 12x, 12y are unseated, such exhaust passages delivering into the central chamber 90 of the body 83, which has an exhaust outlet 80.

The controlling efforts applied to the control members 60, 61, are respectively proportional to the pressures applied to the pistons 56, 57, at 38a and 38b and are both proportional to the leverage of levers 54, 55, as determined by the position of their fulcra 52, 53, i.e. to the extent to which the member 82 is moved to the right by the brake pedal. Consequently, the efforts applied to the front and rear brakes of the vehicle are both proportional to the displacement of the brake pedal and respectively proportional to the loads carried by the front and rear axles.

To provide the driver with "feel," the member 82 has two extensions 74, 75 which penetrate in a fluid-tight manner into chambers 78, 79, respectively. Chambers 78, 79, communicate, via ducts 91, 92, respectively, with the valve chambers immediately downstream of the valve poppets 12x, 12y, so that the pressures downstream of these poppets and upstream of the restrictors 72, 73, are applied to the end faces of the extensions 74, 75, and fed back to the brake pedal, via members 82, 51.

The arrangement further includes a safety device giving partial "manual reversion" in the event of failure of the devices illustrated in FIGURE 8 or of any of the elements of the arrangement of FIGURE 9 which distribute the brake-operating pressures between the service connections 68, 69. This device comprises an additional valve assembly 81, 76, similar to that of FIGURE 3, having a separate pressure feed inlet 88 and a separate service connection 89 communicating with both the front and rear brakes of the vehicle, its axially bored control member 81 having an extension 77. When the member 82 is moved fully to the right it meets the end of extension 77 and pushes the control member 81 to the right to unseat the poppet valve 76 and admit pressure liquid to the brakes from inlet 88, via connection 89, the valve assembly 81, 76, operating in the damped and stable manner previously described. The pressure liquid paths from inlets 64, 65, via valve assemblies 60, 61 etc. to the service connections 68, 69, are thus by-passed.

Either of the features described in the two preceding paragraphs may be omitted, if simplification is an important requirement.

It is to be understood that the invention is not limited to the constructional forms illustrated in and described with reference to the accompanying drawings but may include all such modifications and variations as are within the competence of those skilled in the art without departing from the spirit of the invention and the scope thereof as defined in the hereto appended claims.

Having thus described the invention, what is claimed as new and desired to be secured by Letters Patent is:

1. For controlling the feeding and exhausting of a hydraulic power-utilising system or device, referred to herein as an "actuator," a valve assembly comprising a body having a pressure feed inlet, a service connection for said actuator, and an exhaust outlet, a passage connecting said inlet to said service connection, a valve adapted to close said passage, a movable control member adapted to actuate said valve, a flow-restrictor downstream of said valve for restricting flow through said service connection, said flow-restrictor comprising at least one passage having a ratio of length to cross-sectional area which is great enough to make flow therethrough laminar, means for so applying the pressure subsisting between said valve and said restrictor to said control member as to oppose movement of the latter in the direction for opening said valve, and valve means actuated by said control member, when so moved as to have brought about closure of said first mentioned valve, for establishing communication between said service connection and said exhaust outlet.

2. A valve assembly as defined in claim 1, in which said restrictor is calibrated.

3. A valve assembly as defined in claim 1, in which said restrictor consists of at least one tubular passage.

4. A valve assembly as defined in claim 1, in which said restrictor consists of an annular clearance between a cylindrical bore and a cylindrical piston-like element forming part of said control member and being axially displaceable in said cylindrical bore.

5. A valve assembly as defined in claim 1, said first-mentioned valve being a poppet valve having a stem and said valve means comprising a needle on the end of said stem seatable on an opening in the end of said control member, the latter having an axial bore terminating in said opening and communicating with said exhaust outlet.

6. A valve assembly as defined in claim 1, said first-mentioned valve and said valve means comprising seatable balls and said control member having cam surfaces adapted to unseat said balls.

7. The combination of a valve assembly as defined in claim 1 with a hydraulic actuator comprising a cylinder and a piston displaceable therein, the body of said valve assembly being incorporated in and forming part of said piston.

8. The combination defined in claim 7, said first-mentioned valve being a poppet valve having a stem and said valve means comprising a needle on the end of said stem seatable on an opening in the end of said control member, the latter having an axial bore terminating in said opening and communicating with said exhaust outlet.

9. The combination defined in claim 7, in which the actuator is a double-acting, differential actuator, its piston having opposed surfaces of unequal area, the actuator having a first feed inlet for constantly applying the feed pressure to the smaller-area face of the piston, which communicates with the feed inlet of the valve assembly, the service connection of said valve assembly communicating with the actuator chamber closed by the larger-area face of the piston.

10. A valve assembly as defined in claim 1, further including means for applying to the control member, in the direction for opening said valve, an effort proportional to a mechanical displacement, said means including a mechanically displaceable element and resilient means between said element and said control member, for converting the displacement of said element into a proportional effort exerted on said control member.

11. A hydraulic-servo vehicle brake system including the combination of a valve assembly as defined in claim 1 in which said actuator is a hydraulic actuator connected to said service connection of said valve assembly.

12. Hydraulic valve apparatus for delivering liquid to at least two hydraulic circuits, under pressures determined collectively in accordance with a received "control" effort and individually in accordance with different received "pressure" signals, said apparatus comprising in combination at least two valve assemblies, each including a body having a special fluid inlet, a service connection for an actuator, an exhaust outlet, a passage connecting said inlet to said service connection, a valve adapted to close said passage, a movable control member adapted to actuate said valve, a flow restrictor downstream of said valve for restricting flow through said service connection and comprising a passage having a ratio of length to cross-sectional area great enough to make flow through said restrictor laminar, means for so applying the pressure existing between said valve and said restrictor to said control member so as to oppose movement of the latter in direction of opening of said valve, and valve means actuated by said control member for establishing communication between said service connection and said exhaust outlet when said control member has been moved to close said valve; a pair of levers each tiltable about a fulcrum and respectively engaging at one of the ends thereof said control members of said valve assemblies; a pair of hydraulically operated means receptive to different hydraulic pressures and respectively acting on the other ends of said levers to tilt the same about the respective fulcrum to apply to the respective control member a force proportional to the hydraulic pressure acting on the respective hydraulic means to thus move said control members in valve opening direction; and operator controlled means connected to said fulcra of said levers for displacing the same in longitudinal direction of said levers for varying collectively the forces applied to said control members.

13. Apparatus as defined in claim 12, in which said operator controlled means for varying collectively the forces applied to the control members of said valve assemblies includes a master member carrying said fulcra, and which further includes means for feeding-back the pressures subsisting immediately downstream of said valves of said valve assemblies to said master member, in opposition to the effort exerted by the operator so that the latter may feel said last mentioned pressures.

14. A stable hydraulic servo device comprising, in combination, a cylinder; an actuator piston movable in said cylinder; chamber means; pressure fluid inlet passage means communicating with said chamber means for feeding pressure fluid thereinto; first valve means cooperating with said pressure fluid inlet passage means for opening and closing the same; second passage means providing communication between said chamber means and said cylinder; pressure fluid exhaust passage means communicating with said chamber means for discharging fluid therefrom; second valve means for controlling said pressure fluid exhaust passage means for permitting outflow of pressure fluid from said chamber means through said exhaust passage means when said second valve means is open and for preventing outflow of pressure fluid from said chamber means through said exhaust passage means when said second valve means is closed; a control member having a portion slidably arranged in said chamber means, said portion having an end face facing said pressure fluid inlet passage means to be subjected to the pressure of pressure fluid in said chamber means, said control member cooperating with said first and second valve means for opening said first valve means and closing said second valve means when said control member is moved in one direction so that said end face is subjected to pressure of pressure fluid in said chamber means when said first valve means is opened and said control member when moved in a direction opposite to said one direction closing said first valve means and opening said second valve means; and a flow restrictor for restricting flow of pressure fluid from said chamber means through said second passage means into said cylinder when said first valve means is opened and said second valve means is closed and for restricting flow from said cylinder to said chamber means when said first valve means is closed and second valve means is opened, said flow restrictor comprising at least one passage having a ratio of length to cross sectional area which is great enough to make flow therethrough laminar.

References Cited in the file of this patent
UNITED STATES PATENTS

| | | |
|---|---|---|
| 1,479,386 | Hynes et al. | Jan. 1, 1924 |
| 2,544,042 | Pontius | Mar. 6, 1951 |
| 2,717,579 | Leduc | Sept. 13, 1955 |
| 2,751,752 | Metcalf | June 26, 1956 |
| 2,927,608 | Jenkins et al. | Mar. 8, 1960 |
| 2,934,042 | Stelzer | Apr. 26, 1960 |